(12) United States Patent
Li et al.

(10) Patent No.: US 9,632,720 B2
(45) Date of Patent: Apr. 25, 2017

(54) DATA DE-DUPLICATION (71) Applicant: International Business Machines Corporation, Armonk, NY (US)

(72) Inventors: Ya Jie Li, Beijing (CN); Yu Meng Li, Beijing (CN); Michael G. Sisco, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 14/336,799

(22) Filed: Jul. 21, 2014

(65) Prior Publication Data

US 2015/0066876 A1 Mar. 5, 2015

(30) Foreign Application Priority Data

Aug. 29, 2013 (CN) .......................... 2013 1 0385124

(51) Int. Cl.
*G06F 17/30* (2006.01)
*G06F 3/06* (2006.01)

(52) U.S. Cl.
CPC .......... *G06F 3/0641* (2013.01); *G06F 3/0608* (2013.01); *G06F 3/0674* (2013.01)

(58) Field of Classification Search
CPC ............. G06F 17/30489; G06F 3/0641; G06F 17/30159; G06F 17/30156
See application file for complete search history.

(56) References Cited

U.S. PATENT DOCUMENTS

| | | | |
|---|---|---|---|
| 6,542,975 B1* | 4/2003 | Evers .................. | G06F 11/1458 711/112 |
| 7,519,635 B1 | 4/2009 | Haustein et al. | |
| 8,117,343 B2* | 2/2012 | Lillibridge .............. | G06F 3/061 709/246 |
| 8,250,325 B2 | 8/2012 | Raymond et al. | |
| 8,442,942 B2 | 5/2013 | Leppard | |

(Continued)

FOREIGN PATENT DOCUMENTS

WO WO2012029258 A1 3/2012

OTHER PUBLICATIONS

Yang Li, Tao Lin, Hui Tang, and Peng Sun, "A Chunk Caching Location and Searching Scheme in Content Centric Networking", IEEE ICC 2012—Next Generation Networking Symposium, pp. 2655-2659.*

(Continued)

*Primary Examiner* — Cheryl Lewis
(74) *Attorney, Agent, or Firm* — Yee & Associates, P.C.; Richard A. Wilhelm (57) ABSTRACT

A method and device for data de-duplication, comprising: performing data chunk partition on a current data object by using a different standard in each of a plurality of logical passes; searching one or more first redundant data chunks of the current data object in each logic pass based on the data chunks partitioned on the current data object in the logical pass, respectively, and performing data de-duplication on the current data object based on all of the found first redundant data chunks of the current data object. Other embodiments of the present invention may also relate to a data de-duplication system and a corresponding computer program product.

19 Claims, 6 Drawing Sheets

(56) References Cited

U.S. PATENT DOCUMENTS

| | | | |
|---|---|---|---|
| 8,583,625 B2* | 11/2013 | Peterson | G06F 17/30067 |
| | | | 707/713 |
| 8,935,222 B2* | 1/2015 | Hirsch | G06F 3/0641 |
| | | | 707/692 |
| 9,110,815 B2* | 8/2015 | Hyde, II | G06F 12/0891 |
| 2009/0276454 A1 | 11/2009 | Smith | |
| 2013/0086009 A1 | 4/2013 | Li et al. | |
| 2013/0138620 A1 | 5/2013 | Yakushev et al. | |

OTHER PUBLICATIONS

Dong et al., "Tradeoffs in Scalable Data Routing for Deduplication Clusters", Proceedings of the 9th USENIX Conference on File and Storage Technologies (FAST'11), Feb. 2011, pp. 15-29.*

Dong et al., "Tradeoffs in Scalable Data Routing for Deduplication Clusters," Proceedings of the 9th USENIX Conference on File and Storage Technologies (FAST'11), Feb. 2011, pp. 15-29.

Litwin et al., "Combining Chunk Boundary and Chunk Signature Calculations for Dedublication," IEEE. Latin America Transactions, vol. 10, No. 1, Jan. 2012, pp. 1305-1311.

Meister et al., "A Study on Data Deduolication in HPC Storage Systems," Proceedings of the international Conference on High Performance Computing, Networking, Storage and Analysis (SC'12), Nov. 2012, 11 pages.

* cited by examiner

_DATA DE-DUPLICATION_

CROSS-REFERENCE TO RELATED APPLICATIONS

This application claims the benefit of priority to Chinese Patent Application No. CN201310385124.1, filing date Aug. 29, 2013, the contents of which are hereby incorporated by reference.

TECHNICAL FIELD

The present invention relates to a storage system, and more specifically, relates to a data de-duplication method and apparatus.

BACKGROUND

A data de-duplication system can remove redundant data of data storage, such that more data may be stored in an existing storage capacity, and the total storage overhead would be reduced by replacing the redundant data into a pointer or link.

The existing data de-duplication system may employ a data chunk-based redundant data deletion technology. In a data chunk partition stage, a sliding window is introduced to determine boundaries between data chunks. For example, data fingerprints of data chunks within the sliding window may be calculated with the Rabin fingerprint algorithm. If the calculated result satisfies a certain condition, the start of the window would be flagged as the end of a data chunk. Partition of data chunks of a data object is performed by repeatedly sliding the window and calculating data fingerprints. A HASH value is calculated for each data chunk. By comparing HASH values between current data chunks and recorded data chunks, it can be determined whether redundant data chunks exist.

When a data object is processed through a fingerprint algorithm, for example, Rabin fingerprint algorithm, a set of bytes (also called byte string) would theoretically have a unique 64-bit Rabin fingerprint HASH value. When the last 18 bits of an encrypted HASH value are all zero (called residual value), it is believed that a boundary of data chunks in the set of bytes is found, and a set of such corresponding bytes is called "a data chunk." In other words, when performing $2^{18}$ times of HASH calculations, a data chunk will generate averagely 256K bytes, i.e., the size of a standard data chunk is 256K bytes. Therefore, a predetermined residue value will indicate the average size of data chunks and a de-duplication ratio that the data de-duplication system can reach. A fingerprint mask may be selected so to be used in searching the residual value of a set of bytes. The fingerprint mask is a random value within a predetermined range.

The prior art attempts to improve the de-duplication ratio through changing the data chunk partition algorithm. However, since data chunk distribution derived for the same data object is unique, the capability of finding redundant chunks is limited. Further, since the repetitive data distribution of a data object generally cannot be known in advance, it would be impossible to devise a data chunk partition algorithm that has a higher de-duplication ratio for various kinds of data objects.

Therefore, it is desirable to provide a novel data de-duplication solution so as to at least partially solve the technical problems existing in the prior art.

SUMMARY

In order to solve the problems existing in the prior art, embodiments of the present invention provide a data de-duplication solution for performing data chunk partition based on a plurality of logical passes.

According to one aspect of the present invention, there is provided a method for data de-duplication. The method comprises: performing data chunk partition on a current data object by using a different standard in each logical pass of a plurality of logical passes; searching one or more first redundant data chunks of the current data object in each logical pass based on the data chunks partitioned on the current data object in the logical pass, respectively, and performing data de-duplication on the current data object based on all of the found first redundant data chunks of the current data object.

According to another aspect of the present invention, there is provided a data de-duplication system. The system comprises: a data chunk partition unit configured to perform data chunk partition on a current data object by using a different standard in each of a plurality of logical passes; a first redundant data chunk determining unit configured to search one or more first redundant data chunks of the current data object in each logical pass based on the data chunks partitioned on the current data object in the logical pass, respectively, and a data de-duplication unit configured to perform data de-duplication to the current data object based on all of the first redundant data chunks found by the first redundant data chunk determining unit.

According to a further aspect of the present invention, there is also provided a computer program product, comprising a computer-readable instruction, such that when being executed by a processor, the computer-readable instruction performs the data de-duplication method according to one embodiment of the present invention.

Various embodiments of the present invention may provide a higher de-duplication ratio than a single logical pass technical solution.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
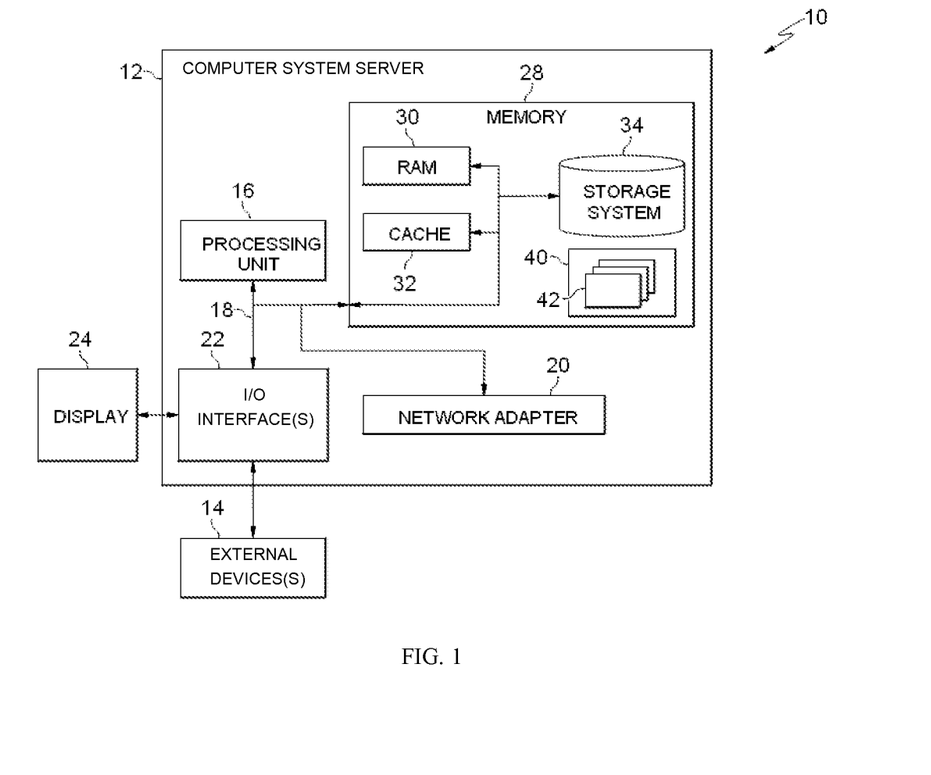
FIG. 1 shows an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

According to various embodiments of the present invention, the problems existing in the prior art can be solved by providing a data de-duplication solution for performing data chunk partition in a plurality of logical passes. Mainly, according to the embodiments of the present invention, data chunk partition is performed on a current data object in the plurality of logical passes by using different standards, and data de-duplication is performed on the data object based on the redundant data chunks determined in the respective logical passes, thereby greatly enhancing the data de-duplication ratio compared with a single logical pass based technical solution. Here, the "redundant data chunks" of the current data object refer to duplicated data chunks of the current data object determined with respect to a previous data object.

Figure 2:
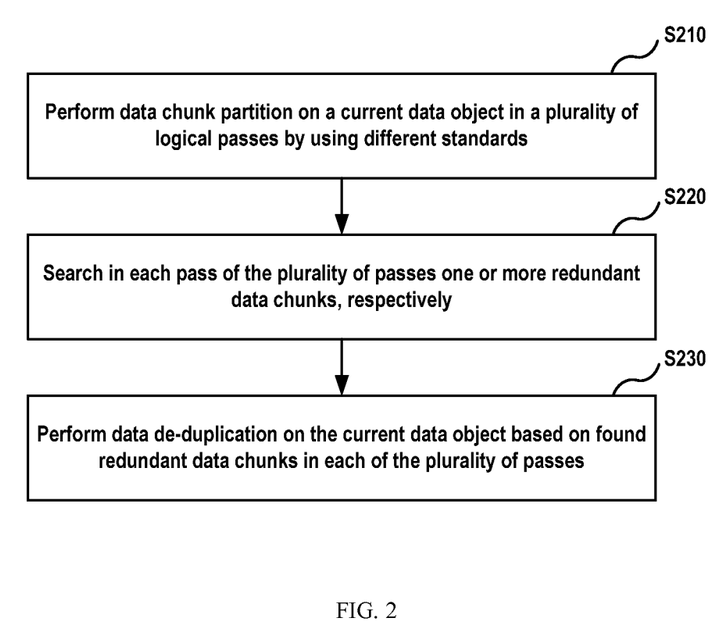
FIG. 2 shows a flow chart of a data de-duplication method according to one embodiment of the present invention.

FIG. 2 shows a flow chart of a data de-duplication method according to one embodiment of the present invention.

As shown in FIG. 2, at step S210, data chunk partition is performed on a current data object in each of a plurality of logical passes by using a different standard.

Figure 3:
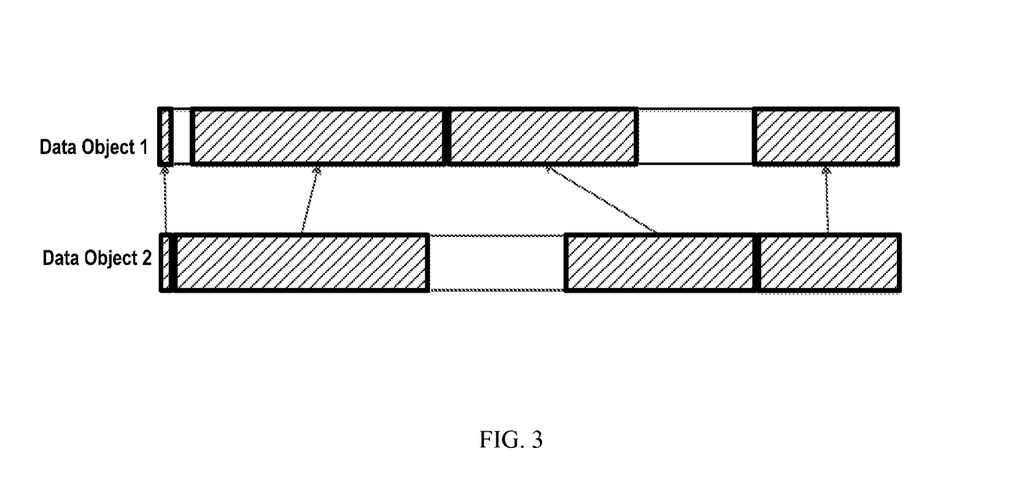
FIG. 3 shows a legend of an example of a data object.

The "data object" here may refer to a file, a compressed file, or a version of a file, and any data such as a file image stored in a particular path of a storage system at a time point. FIG. 3 shows a legend of an example of two data objects having redundant data. For example, the two data objects as shown in FIG. 3 may be two different data versions, wherein data object 2 is generated by deleting or adding some content on the basis of data object 1. Of course, data objects 1 and 2 as shown in FIG. 3 may also be understood as different files, compressed files, images, and the like, which have different redundant data with respect to each other, rather than being limited to different versions of the same file. As shown in FIG. 3, data object 1 and data object 2 have redundant data, which is depicted with shadow, while the correspondence relationships between redundant data and data contents are shown by arrows between the two object objects.

Figure 4A:
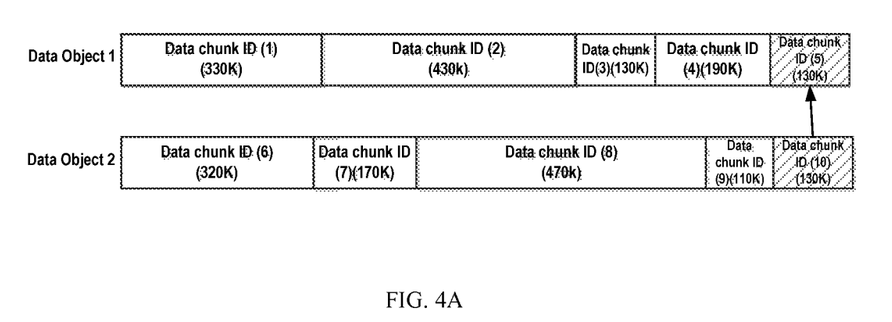
FIGS. 4A and 4B show results of determining first redundant data chunks with respect to the data object shown in FIG. 3 in different logical passes according to one embodiment of the present invention, respectively.

In an ideal data chunk partition, in order to remove all redundant data, it is needed to perform data chunk partition on data object 1 and data object 2 in the manner shown in FIG. 3. In this way, all redundant data may be removed, for example, by only storing, for a redundant data chunk in the data object 2 (as the current data object), a link to a corresponding data chunk in data object 1 (as the previous data object). However, in a real data chunk partition algorithm, it is impossible to perform data chunk partition on data object 1 and data object 2 as accurately as FIG. 3, and as a consequence, only a part of redundant data can be found and deleted. For example, in the Rabin fingerprint algorithm, if one fingerprint mask is selected to search a residual value whose last 18 bits are all zero, then in the data chunk partition result as shown in FIG. 4A, only the last 130K redundant data chunks can be found in data object 1 and data object 2. In other words, the data chunk with a data chunk identifier (ID) of 10 and a length of 130K in data object 2 is a duplicated data of the data chunk with a data chunk ID of 5 and a length of 130K in data object 1. Namely, the data chunk 10 is a redundant data chunk. In a solution of adopting a single logical pass to perform data chunk partition, a similar problem also exists when adopting other data chunk partition algorithms, for example, fixed length data chunk partition algorithm, other variable length fingerprint algorithm, etc., i.e., only data chunks of a part of redundant data can be determined, which limits the data de-duplication ratio.

In order to effectively enhance the data de-duplication ratio, various embodiments of the present invention propose to perform data chunk partition on the same data object with different standards in a plurality of logical passes, so as to compensate for the limitation of the single logical pass data chunk partition by performing different data chunk partitions to the same data object in a plurality of logical passes. Here, the term "logical pass" means that there includes a series of associated processing inside one logical pass, but different logical passes are independent from each other. Various logical passes may be implemented using the same hardware and/or software resource, or implemented using different hardware and/or software resources. In other words, various appropriate implementation manners of "logical passes" are included within the scope of disclosure of the present invention.

Figure 4B:
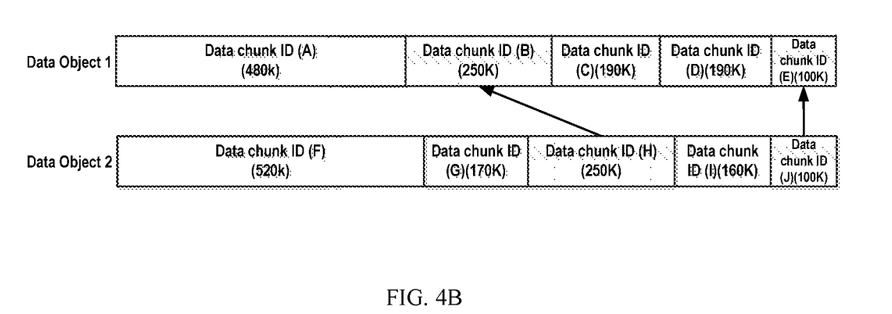

For example, in one embodiment, data chunk partitions may be performed to the same data object (for example, data object 1 and data object 2) in more logical passes according to different standards. As shown in FIG. 4B, the Rabin fingerprint algorithm is likewise employed in the second logical pass, but another different fingerprint mask is selected to search the residual value whose last 18 bits is 0x02011. In this example, the resultant average size of the data chunk is still 256K, but for a specific data object, completely different data chunk distribution may be obtained. As shown in FIG. 4B, in the second logical pass, by using a different data chunk partition standard, each data object would obtain a data chunk distribution different from the first logical pass as shown in FIG. 4A.

Although only two logical passes are shown in FIG. 4A and FIG. 4B, those skilled in the art would appreciate that the embodiments of the present invention may also employ more than two logical passes. With the increase of logical pass number, different data chunk distributions for the same data object as obtained through different local passes may effectively cover more redundant data, such that it is expected to greatly enhance the data de-duplication ratio of the data de-duplication system. However, when the data de-duplication ratio reaches a certain threshold (at least partially dependent on the actual data redundancy of the data object), increasing the number of logical passes cannot achieve a larger benefit any more, which, on the contrary, would increase processing overheads. Therefore, the embodiments of the present invention do not recommend excessively increasing the number of logical passes, but recommend setting the number of logical passes reasonably based on the desired de-duplication ratio for the processed data object and the processing overheads that can be borne.

Besides, although the currently popular Rabin fingerprint algorithm is used to perform data chunk partition in the logical passes as shown in FIG. 4A and FIG. 4B, those skilled in the art would appreciate that the embodiments of the present invention are not limited thereto, and any data chunk partition algorithm may be employed in respective logical passes. As long as data chunk partition is performed to the same data object according to different standards, while different data chunk distributions are obtained in the respective logical passes, the technical solution according to the embodiments of the present invention can be implemented.

For example, in one embodiment, performing data chunk partition on the current data object in a plurality of logical passes by using different standards may comprise performing data chunk partition on the current data object with a fixed length algorithm by using different data chunk lengths in respective logical passes. In another embodiment, performing data chunk partition on the current data object in a plurality of logical passes by using different standards may comprise performing data chunk partition on the current data object with a variable length algorithm by using different data chunk lengths in respective logical passes. In another embodiment, a combination of the above embodiments may be employed. Different partition parameters of one kind of partition algorithm may be used in some passes, while different partition parameters of another kind of partition algorithm may be used in some other passes, thereby obtaining different data chunk distributions for the data object in the different logical passes. For example, different fingerprint masks of the Rabin fingerprint algorithm may be used to perform data chunk partition on the data object in some passes, while different data chunk lengths of the fixed length partition algorithm may be used to perform data chunk partition on the data object in some other passes, and so forth.

In step S220, in each logical pass, one or more first redundant data chunks of the current data object are searched based on the data chunks partitioned on the current data object in the logical pass.

According to various embodiments of the present invention, any existing redundant data chunk determining algorithm may be employed in respective logical passes. For example, the HASH value of the current data chunk can be compared with that of the stored data chunk so as to determine whether redundant data chunks exist. Actually, which algorithm is employed in each logical pass to determine the redundant data chunks does not affect implementation of the technical solutions according to various embodiments of the present invention. Here, in order to simplify the depiction and highlight the inventive concept, depiction of a specific redundant data chunk determining algorithm is omitted.

According to one embodiment of the present invention, in each logical pass, first redundant data chunks of the current data object (for example, data object 2 in FIGS. 4A and 4B) are searched based on data chunks partitioned on a previous data object (for example, data object 1 in FIG. 4A and FIG. 4B) by using a corresponding standard of the logical pass and the data chunks partitioned on the current data object (for example, data object 2 in FIGS. 4A and 4B) by using the same standard of the logical pass.

In the embodiments shown in FIG. 4A and FIG. 4B, in the first logical pass as shown in FIG. 4A, it may be determined that the data chunk with a data chunk identifier (ID) of 10 and a length of 130 k in the data object 2 is a duplicated data of the data chunk with a data chunk ID of 5 and a length of 130K in data object 1, i.e., determining that data chunk 10 is a redundant data chunk; in the second logical pass as shown in FIG. 4B, it may be determined that the data chunk with a data chunk ID of H and a length of 250K of the data object 2 is a duplicated data of the data chunk with a data chunk ID of B and a length of 250K of data object 1, and the data chunk with a data chunk ID of J and a length of 100K of the data object 2 is a duplicated data of the data chunk with a data chunk ID of E and a length of 100K of data object 1, i.e., determining that the data chunk H and the data chunk J are redundant data chunks.

According to one embodiment of the present invention, a data chunk information table may be built and stored for the data objects processed via respective logical passes, so as to record the data chunk information for a specific data object in each logical pass, including recording determined redundant data chunk information.

For example, with respect to data object 1, the data chunk information table as shown in Table 1 may be derived through processing in the first logical pass.

TABLE 1

| Data Chunk ID | Offset | Length | HASH value | Data Object | Data Chunk Link |
|---|---|---|---|---|---|
| 1 | 0 | 330k | xxxx | 1 | Null |
| 2 | 330k | 430k | xxxx | 1 | Null |
| 3 | 760k | 130k | xxxx | 1 | Null |
| 4 | 890k | 190k | xxxx | 1 | Null |
| 5 | 1080k | 130k | xxxx | 1 | Null |

It may be seen that it is not determined in the first logical pass that any redundant chunk exists in data object 1; thus, the data chunk link domain is unanimously "null" for each data chunk.

TABLE 2

| Data Chunk ID | Offset | Length | HASH value | Data Object | Data Chunk Link |
|---|---|---|---|---|---|
| A | 0 | 480k | xxxx | 1 | Null |
| B | 480k | 250k | xxxx | 1 | Null |
| C | 730k | 190k | xxxx | 1 | Null |
| D | 920k | 190k | xxxx | 1 | Null |
| E | 1110k | 100k | xxxx | 1 | Null |

Similarly, it is not determined in the second logical pass whether any redundant chunk exists in data object 1; thus, the data chunk link domain is unanimously "null" for each data chunk.

For example, for data object 2, the data chunk information table as shown in Table 3 may be derived through processing in the first logical pass.

TABLE 3

| Data Chunk ID | Offset | Length | HASH value | Data Object | Data Chunk Link |
|---|---|---|---|---|---|
| 6 | 0 | 320k | xxxx | 2 | Null |
| 7 | 320k | 170k | xxxx | 2 | Null |
| 8 | 490k | 470k | xxxx | 2 | Null |
| 9 | 960k | 110k | xxxx | 2 | Null |
| 10 | 1070k | 130k | xxxx | 2 | Data chunk 5 |

It can be seen that it is determined in the first logical pass that the data object 2 has a redundant data chunk 10; therefore, the data chunk link of the data chunk 10 cites the data chunk 5 of the data object 1, which is obtained from the first logical pass, while for the remaining chunks, since they are not determined as redundant data chunks yet, their data chunk link domains are all "null."

For data object 2, the data chunk information table as shown in Table 4 may be derived through processing in the second logical pass.

TABLE 4

| Data Chunk ID | Offset | Length | HASH value | Data Object | Data Chunk Link |
|---|---|---|---|---|---|
| F | 0 | 520k | xxxx | 2 | Null |
| G | 520k | 170k | xxxx | 2 | Null |
| H | 690k | 250k | xxxx | 2 | Data chunk B |
| I | 940k | 160k | xxxx | 2 | Null |
| J | 1100k | 100k | xxxx | 2 | Data chunk E |

Similarly, in the second logical pass, it is determined that data object 2 has redundant data chunk H and redundant data chunk J; therefore, the data chunk link domain of the data chunk H cites the data chunk B of the data object 1 which is obtained from the second logical pass, the data chunk link domain of the redundant data chunk J cites the data chunk E of the data object 1, which is obtained from the second logical pass, while for the remaining data chunks, since they are not determined as redundant data chunks, their data chunk link domains are all "null."

Data de-duplication is performed on the data object based on the redundant data chunks found in each of the plurality of logical passes.

Although data chunk information tables obtained with respect to different data objects such as data object 1 and data object 2 in the same logical pass are expressed as different tables 1, 2, 3, and 4 for the sake of depiction, in an actual system, it may be selected to consolidate data chunk information generated by performing data chunk partition to different data objects in the same logical pass into one table. For the above embodiments, table 1 and table 3 may be formed into the same table specific for the first logical pass, while table 2 and table 4 may be formed into the same table specific for the second logical pass. It would be appreciated that such setting would facilitate determination of the redundant data chunks in one logical pass. In another example, it may also be selected to merge the data chunk information generated by performing data chunk partition on the same data object in different data logical passes into one table. For the above embodiments, table 1 and table 2 may be formed into a single table specific for the data object 1, while table 3 and table 4 may be formed into a single table specific for the data object 2. With reference to the subsequent depiction, it would be appreciated that such setting might help to finally determine redundant data chunks for data objects in subsequent steps. Of course, those skilled in the art would appreciate that the manner of implementing data chunk information table would not constitute any limitation to the embodiments of the present invention.

In step S230, data de-duplication is performed on the current object based on redundant data chunks of the current data object in the respective logical passes.

Continue to consider the above example. Although step S230 also needs to be performed for each data object in an actual system, since in the above example, no redundant data chunks in data object 1 are found in each logical pass, while redundant data chunks in data object 2 have been determines in the logical pass, step 230 will be depicted with reference to data object 2.

According to various embodiments of the present invention, since different data chunk distributions for the same data object would be obtained in a plurality of logical passes, the probability of finding redundant data in the data object can be increased.

According to one embodiment of the present invention, based on offsets and lengths of redundant data chunks as determined in the respective logical passes, overlap portions existing between two or more redundant data chunks are eliminated so as to only reserve in one redundant data chunk a portion corresponding to the overlap portion. Data de-duplication is performed on the data object by deleting the redundant data chunk after the overlap portion is eliminated.

In one exemplary embodiment, the determined redundant chunks are sorted according to offsets of the redundant data chunks as determined in the respective logical passes.

For data object 2, the redundant data chunk 10 is determined in the first logical pass, and the redundant data chunks H and J are determined in the second logical pass. The redundant data chunks 10, H, and J as determined in all logical passes are sorted in an ascending order according to for example the offsets of data chunks, and then the corresponding data chunk information entries are:
(data chunk H, 690 k, 250 k, data object 2, citing data chunk B)
(data chunk 10, 1070 k, 130 k, data object 2, citing data chunk 5)
(data chunk J, 1100 k, 100 k, data object 2, citing data chunk E)

If an overlap portion exists between two or more redundant data chunks, the overlap portion should be eliminated by merging corresponding redundant data chunks based on the sorted redundant data chunks in conjunction with the length information of respective redundant data chunks.

For each redundant data object of data object 2, overlap exists in chunk 10 and chunk J, and by merging the data chunk 10 and the data chunk J, the final redundant data chunk of the data object 2 may be obtained:
(data chunk H, 690 k, 250 k, data object 2, citing data chunk B)
(data chunk 10, 1070 k, 130 k, data object 2, citing data chunk 5)
wherein the final redundant data chunk includes all of the redundant data contained in the redundant data chunks determined in the respective logical passes, i.e., including redundant data chunks after the overlap portion is eliminated. By deleting the final redundant data chunk, data de-duplication is performed on the second data object.

In this example, since data chunk 10 completely includes data chunk J, the merged redundant chunk ID may be still marked as "10." It would be readily contemplated that in other possible examples, a data chunk ID may be re-assigned to the redundant data chunk generated after elimination of the overlap to form a new data chunk information entry.

According to one embodiment of the present invention, data chunk partition can be re-performed on the data object 2 based on the determined final redundant data chunk(s). Among the data chunks, redundant data chunks H and 10 act as two data chunks, while the remaining non-redundant data act as individual data chunks, which will be depicted in detail with reference to FIG. 5.

Figure 5:
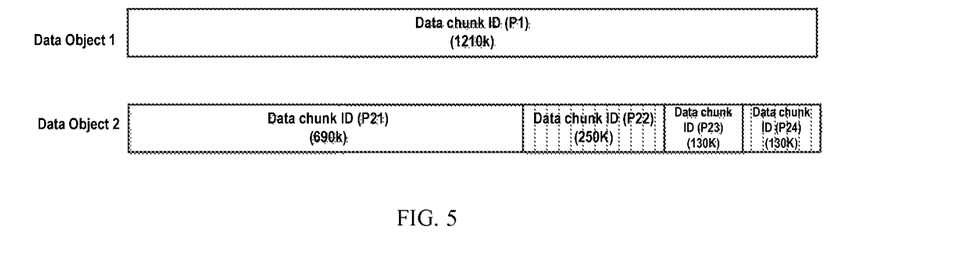
FIG. 5 shows distribution of data chunks as finally determined with respect to the data object according to one embodiment of the present invention.

FIG. 5 shows distribution of data chunks as finally determined with respect to the data object according to one embodiment of the present invention.

For data object 1, since no redundant data chunk is determined in the respective logical passes, data object 1 has no redundant data with respect to the stored data in the system. The data object 1 is stored as a single data chunk P1, wherein the data chunk P1 has an offset 0, a length 1210K and a "Null" data chunk link.

For data object 2, with the finally determined redundant data chunks H and 10 as two data chunks, as shown in FIG. 5, the data object 2 may be partitioned into 4 data chunks: chunk P21, P22, P23, and P24, wherein data chunk P22 and data chunk P24 correspond to redundant data chunk H and redundant data chunk 10, respectively, while data chunk 21 and data chunk 23 correspond to non-redundant data. In data storage, data de-duplication is performed to data object 2 through deleting data chunk P22 and data chunk P23 (corresponding to the redundant data chunk H and redundant data chunk 10, respectively).

The final data chunk partition of data object 1 and data object 2 is stored in the table such as table 5 as the physical layer data chunk distribution information.

TABLE 5

| Data Chunk ID | Offset | Length | Data object | Data chunk link |
|---|---|---|---|---|
| P1 | 0 | 1210k | 1 | Null |
| P21 | 0 | 690k | 2 | Null |
| P22 | 690k | 250k | 2 | P1(480k, 250k) |
| P23 | 940k | 130k | 2 | Null |
| P24 | 1070k | 130k | 2 | P1(1080k, 130k) |

It should be noted that although the data chunk link field for the specific data chunk in table 5 stores offset ranges of data object 1, the value of the data chunk link field may be implemented in any appropriate form. As another example, the data chunk link field may also cite a data chunk ID partitioned in each logical pass.

In one embodiment, when a data object needs to be recovered, the data object may be recovered based on a link stored for the deleted redundant data chunk (for example, data chunk P22 and data chunk P24 of data object 2).

The flow of a method for data de-duplication according to one or more embodiments of the present invention has been depicted above with reference to FIGS. 2-5. It should be appreciated that some steps may be performed in parallel or in series in specific implementation. For example, the steps of performing data chunk partition and determining redundant data chunks in respective logical passes may be performed in parallel between the respective logical passes or performed in series between the respective logical passes. Modifications and variation readily contemplated by those skilled in the art will not depart from the essence of the present invention and are therefore all included within the scope of the present invention.

Figure 6:
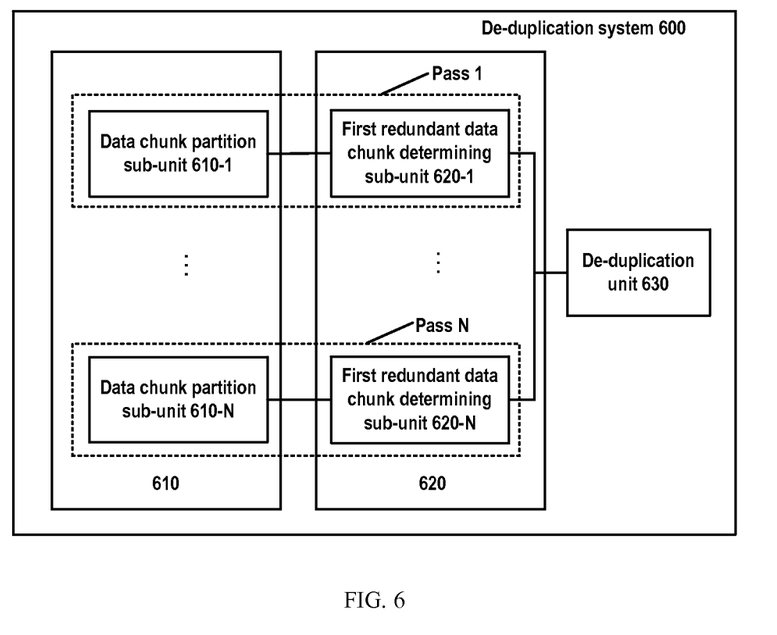
FIG. 6 shows a block diagram of a data de-duplication system according to one embodiment of the present invention.

FIG. 6 shows a block diagram of a data de-duplication system 600 according to one embodiment of the present invention.

As shown in FIG. 6, the data de-duplication system 600 comprises a data chunk partition unit 610 and a first redundant data chunk determining unit 620. The data chunk partition unit 610 and the first redundant data chunk determining unit 620 are configured to support a plurality of logical passes 1-N, each logical pass comprising corresponding data chunk partitioning sub-unit 610-1, . . . , 610-N, and first redundant data chunk determining sub-unit 620-1, . . . , 620-N. The data de-duplication system 600 further comprises a data de-duplication unit 630 receiving input from the respective logical passes.

The data chunk partition unit 610 is configured to perform data chunk partition on a current data object in a plurality of logical passes by using different standards. In the logical passes 1-N, each data chunk partition sub-unit among the data chunk partition sub-units 610-1, ..., 610-N is configured to perform data chunk partition on the current data object by using one corresponding standard among N different standards, such that each data chunk partition sub-unit uses a different standard to perform data chunk partition.

According to one embodiment of the present invention, the data chunk partition subunits 610-1, ..., 610-N in the respective logical passes may be data chunk partition sub-units based on the fingerprint algorithm. The data chunk partition sub-units 610-1, ..., 610-N can be configured to perform data chunk partition on the current data object by using different fingerprint masks 1-N in the respective logical passes, thereby obtaining different data chunk distributions.

According to another embodiment of the present invention, the data chunk partition subunits 610-1, ..., 610-N in the respective logical passes may be fixed length data chunk partition units based on the fixed length algorithm. The data chunk partition sub-units 610-1, ..., 610-N can be configured to perform data chunk partition on the current data object by using different data chunk lengths 1-N in the respective logical passes, thereby obtaining different data chunk distributions.

According to another embodiment of the present invention, the data chunk partition subunits 610-1, ..., 610-N in the respective logical passes may be data chunk partition sub-units based on different data chunk partition algorithms. The data chunk partition sub-units 610-1, ..., 610-N are configured to perform data chunk partition on the current data object in the respective logical passes, thereby obtaining different data chunk distributions.

According to a further embodiment of the present invention, some data chunk partition sub-units among the data chunk partition sub-units 610-1, ..., 610-N may perform partition on a data object for example by using different partition parameters of one kind of partition algorithm (for example, using different fingerprint masks in the Rabin fingerprint algorithm), while some other data chunk partition sub-units may perform data chunk partition on the data object for example by using different partition parameters of another partition algorithm (for example, using different data chunk lengths in the fixed length partition algorithm).

The first redundant data chunk determining sub-units 620-1, ..., 620-N are configured to search one or more first redundant data chunks for the current data object in their respective logical passes based on the data chunks partitioned on the current data object in the respective logical passes, respectively According to one embodiment, each first redundant data chunk determining sub-unit of the first redundant data chunk determining sub-units 620-1, ..., 620-N searches first redundant data chunks of the current data object based on the data chunks partitioned on a previous data object by using a corresponding standard in its logical pass and the data chunks partitioned on the current data object by using the same standard in the logical pass. Any existing algorithm may be used to determine the first redundant data chunk. Algorithm per se which is employed in each logical pass to determine the redundant data chunks does not limit implementation of the technical solutions according to various embodiments of the present invention. Here, in order to simplify the depiction and highlight the inventive concept, depiction of specific working principle of a specific first redundant data chunk determining unit is omitted.

According to one embodiment of the present invention, the first redundant data chunk determining sub-units 620-1, ..., 620-N or any additional units (not shown) in the logical pass may build a data chunk information table for the data object and store it in a memory unit (not shown), so as to record data chunk information for a specific data object and the determined redundant data chunk information in each logical pass. The data chunk information tables are, for example as above depicted in Tables 1-4.

The data de-duplication unit 630 is configured to perform data de-duplication on the data object based on the first redundant data chunks found by the first redundant data chunk determining sub-units 620-1, ..., 620-N.

According to one embodiment of the present invention, the data de-duplication unit 630 may further comprise an overlap portion eliminating unit (not shown in FIG. 6). The overlap portion eliminating unit may eliminate overlap portions existing between two or more first redundant data chunks based on offsets and lengths of first redundant data chunks found in the respective logical passes of a plurality of logical passes, so as to reserve the portion corresponding to the overlap portion in only one redundant data chunk. In one exemplary embodiment, the overlap portion eliminating unit may comprise a sorting unit and a merging unit (not shown in FIG. 6) so as to determine a second redundant data chunk. The sorting unit may sort the first redundant data chunks according to the offsets of the first redundant data chunks as determined by a plurality of data chunk partition units, for example, in an ascending order by offsets. Next, according to the sorted first redundant data chunks and based on the lengths of the first redundant data chunks, the merging unit may merge the corresponding first redundant data chunks to eliminate overlap portions when the overlap portions exist between two or more adjacent first redundant data chunks, so as to determine the second redundant chunks. The second redundant data chunks include all redundant data contained in all first redundant data chunks, i.e., the second redundant data chunks include first redundant data chunks after the overlap portions are eliminated.

According to one embodiment of the present invention, one individual unit or a unit (not shown in FIG. 6) integrated with other units may re-perform data chunk partition on the data object based on the determined second redundant data chunks and store the final data chunk partition as a physical layer chunk distribution information table in a memory unit (not shown), for example, as depicted with reference to Table 5. The final data chunk partition on the data object is based on each of the second redundant data chunks, for example, the data chunk partition of data object 2 as depicted with reference to FIG. 5. The data de-duplication unit 630 is configured to perform data de-duplication to the data object by deleting the second redundant data chunks, for example, according to the physical layer data chunk distribution information table as depicted in the above embodiments.

In one embodiment, the data de-duplication system 600 further comprises a recovering unit (not shown). The recovering unit may recover the data object based on the link stored for the second redundant data chunk.

The system 600 for example may be implemented as a computer system as shown in FIG. 2, and the functionalities of various components may be implemented through the functions of various components of the computer system as shown in FIG. 2 or a combination of functions of the various components.

According to a further aspect of the present invention, there is further provided a corresponding computer program product which is existing computer program code, the computer program code being configured to cooperate with at least one processor of the system 600 to enable the system 600 to execute at least a computer instruction to control the above various components of the system 600 to perform corresponding functions.

A data de-duplication system according to one or more embodiments of the present invention has been depicted with reference to FIG. 6. Although respective logical passes in FIG. 6 are illustrated as parallel logical passes, it should be understood that the respective logical passes may also be implemented as serial logical passes. In serial logical passes, when a logical pass completes processing of a data object, it throws the data object to the next logical pass to continue execution of the processing. Modifications and variation readily contemplated by those skilled in the art do not depart from the essence of the present invention and are therefore all included within the scope of the present invention.

According to various embodiments of the present invention, since data chunks of a data object are derived from a plurality of logical passes adopting different data chunk partition standards, more duplicated data may be found based on different data chunk distributions. Compared with the existing data de-duplication system, the data de-duplication system according to the embodiments of the present invention can improve the data de-duplication ratio more effectively.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data de-duplication when processing a plurality of data objects, being executed on a hardware device, comprising:
    performing data chunk partition during each of a plurality of logical passes of a current data object of the plurality of data objects, where the data chunk partition is performed using a respective different standard in each logical pass of the plurality of logical passes;
    searching, during the each logical pass of the plurality of logical passes, to find one or more first redundant data chunks of the current data object based on data chunks partitioned on a data object previously processed using the respective different standard; and
    performing data de-duplication on the current data object based on all of the found first redundant data chunks of the current data object.

2. The method according to claim 1, wherein performing data chunk partition comprises at least one of the following:
    performing data chunk partition on the current data object with a fingerprint algorithm by using different fingerprint masks in the respective logical passes;
    performing data chunk partition on the current data object with a fixed length algorithm by using different data chunk lengths in the respective logical passes; and
    performing data chunk partition on the current data object by using different partition algorithms in the respective logical passes.

3. The method according to claim 1, wherein searching, during the each of the plurality of logical passes, to find one or more first redundant data chunks of the current data object comprises:
    searching, in each logical pass, first redundant data chunks of the current data object based on data chunks partitioned on a previous data object by using the standard of the logical pass and data chunks partitioned on the current data object by using the standard of the logical pass.

4. The method according to claim 1, wherein performing de-duplication on the current data object comprises:
    eliminating overlap portions existing between two or more first redundant data chunks found in each logical pass of the plurality of logical passes, based on offset and length of the first redundant data chunks;
    performing data de-duplication on the current data object through deleting second data redundant chunks, wherein the second redundant data chunks include first redundant data chunks with the overlap portions being deleted.

5. The method according to claim 4, wherein eliminating overlap portions existing between two or more first redundant data chunks comprises:
    sorting the first redundant data chunks according to offset of the first redundant data chunks; and
    merging two or more first redundant data chunks having overlap portions based on the sorted first redundant data chunks and according to length of the first redundant data chunks, so as to determine the second redundant data chunks of the current data object.

6. The method according to claim 5, further comprising:
    recovering the current data object according to a link stored for the second redundant data chunks.

7. The method according to claim 4, wherein the deleted second data redundant chunks are a plurality of discontinuous data chunks in a file.

8. The method according to claim 7, wherein a different fingerprint mask is used for each respective logical pass of the plurality of passes when performing the data chunk partition.

9. A computer program product comprising program code stored on a non-transitory computer readable storage medium that is configured to perform the method of claim 1 when executed by a data processing apparatus.

10. The method according to claim 1, wherein different data chunk distributions for a same data object are obtained in each of the plurality of logical passes.

11. A system for data de-duplication when processing a plurality of data objects, being executed on a hardware device, comprising:
- a memory;
- a data chunk partition unit configured to perform data chunk partition during each of a plurality of logical passes of a current data object of the plurality of data objects, where the data chunk partition is performed using a respective different standard in each logical pass of the plurality of logical passes;
- a first redundant data chunk determining unit configured to search, during the each logical pass of the plurality of logical passes, to find one or more first redundant data chunks of the current data object based on data chunks partitioned on a data object previously processed using the respective different standard; and
- a data de-duplication unit configured to perform data de-duplication on the current data object based on all of the found first redundant data chunks of the current data object.

12. The system according to claim 11, wherein the data chunk partition unit is configured to perform at least one of the following:
- performing data chunk partition on the current data object with a fingerprint algorithm by using different fingerprint masks in the respective logical passes;
- performing data chunk partition on the current data object with a fixed length algorithm by using different data chunk lengths in the respective logical passes; and
- performing data chunk partition on the current data object by using different partition algorithms in the respective logical passes.

13. The system according to claim 11, wherein the first redundant data chunk determining unit is configured to:
- search, in each logical pass, first redundant data chunks of the current data object based on data chunks partitioned on a previous data object by using the standard of the logical pass and data chunks partitioned on the current data object by using the standard of the logical pass.

14. The system according to claim 11, wherein the data de-duplication unit further comprises:
- an overlap portion eliminating unit configured to eliminate overlap portions existing between two or more first redundant data chunks found in each logical pass of the plurality of logical passes, based on offset and length of the first redundant data chunks;
- wherein the data de-duplication unit is configured to perform data de-duplication on the current data object through deleting second redundant data chunks, wherein the second redundant data chunks include the first redundant data chunks with the overlap portions being eliminated.

15. The system according to claim 14, wherein the overlap portion eliminating unit further comprises:
- a sorting unit configured to sort the first redundant data chunks according to offset of the first redundant data chunks; and
- a merging unit configured to merge two or more first redundant data chunks having overlap portions based on the sorted first redundant data chunks and according to length of the first redundant data chunks, so as to determine the second redundant data chunks of the current data object.

16. The system according to claim 15, further comprising:
- a recovering unit configured to recover the current data object according to a link stored for the second redundant data chunks.

17. The system according to claim 14, wherein the deleted second data redundant chunks are a plurality of discontinuous data chunks in a file.

18. The system according to claim 17, wherein a different fingerprint mask is used for each respective logical pass of the plurality of passes when performing the data chunk partition.

19. The system according to claim 11, wherein different data chunk distributions for a same data object are obtained in each of the plurality of logical passes.

* * * * *